United States Patent Office 2,992,936
Patented July 18, 1961

2,992,936
CLAY PRODUCTS AND METHODS OF PRODUCING THEM
Ben W. Rowland, Elizabeth, N.J., assignor to Georgia Kaolin Company, Elizabeth, N.J.
No Drawing. Filed Nov. 21, 1958, Ser. No. 775,355
5 Claims. (Cl. 106—288)

This invention relates to clay products and methods of producing them and more particularly to a clay product having unusual properties of brightness, gloss and opacity.

Large amounts of kaolin are used in the coating of paper to produce a high quality surface for printing. The qualities of brightness, gloss and opacity are of prime importance in such coating clays. These qualities have in the past been achieved primarily by selection of natural crudes which impart these particular properties. However, it is increasingly difficult to find natural deposits which will inherently have these characteristics as well as the necessary qualities of ink absorption and viscosity for paper coating.

I have discovered a clay product and method of producing same which will produce substantial improvements in gloss, brightness and opacity as compared to these properties hitherto attainable with any given crude.

I have found that by selecting from naturally occurring kaolin clay a fraction made up of clay particles of several size ranges with specific concentrations I can produce a coating of surprising brightness, gloss and opacity. Such a clay will produce these characteristics to a greater degree than any heretofore available from a given crude. I have found that not only is my invention applicable to the improvement of lower quality clays but that by applying my invention to the best coating clays heretofore produced I can obtain a significantly improved product.

My invention will be perhaps best explained by reference to the following examples showing preferred practices of my invention.

Example I

A mill-run crude was placed in a Reed dough-mixer and vigorously blunged at 78% solids with 0.3% Calgon (sodium hexametaphosphate). Slip solids were then lowered to 31% for degritting. 13% grit was removed by gravity settling through 12 inches for 15 minutes. The degritted clay was then reduced to 21% solids. Degritted clay slip at 21% solids was passed through laboratory Sharples centrifuge at 400 cc. per minute at 6300 r.p.m. To improve the sharpness of the fractionation, the effluent was recentrifuged at the same rate and r.p.m. This final effluent represented the cut taken off the fine particle size end of the degritted crude slip and amounted to 22% by weight of the degritted crude. The clay remaining after removal of 22% fines was re-slurried to about 20% solids with 0.15% Calgon and settled by gravity through a 1 inch slip depth. The sedimented coarse clay amounted to 48.3% of degritted pipe line slip.

Substracting the amount of fine clay and the amount of coarse clay as removed above; 100−(22+48)=30% of the original clay. This 30% of clay remaining suspended in water was adjusted to pH 3.7 with sulphuric acid following 4 lbs. per ton sodium bleach and allowed to stand quietly overnight. Aluminum chloride was then added to facilitate filtering. The flocculated material was filtered, oven-dried and pulverized.

Particle size determinations showed the following distribution in terms of average spherical diameter in the clay produced by this practice.

98% by wt. less than 5 microns equivalent spherical diameter

89% by wt. less than 1.7 microns equivalent spherical diameter

75% by wt. less than 1 micron equivalent spherical diameter

32% by wt. less than 0.5 micron equivalent spherical diameter.

11% by wt. less than 0.3 micron equivalent spherical diameter.

Coating colors were prepared at 58% solids, using 14% preconverted starch on clay. 8 lb. coatings were made on West Virginia coating paper and calendered at 41% R.H. (4.2% water in sheets), 2 passes through calender at 20 lbs. gauge pressures to approximate commercial coating gloss levels. The results compared to a commercial sample of top grade domestic coating clay, the following data were obtained.

|  | Clay of my invention | Top grade commercial |
| --- | --- | --- |
| Clay brightness | 88.7 | 86.7 |
| Slip viscosity (10) | 460 | 240 |
| Slip viscosity (100) | 148 | 102 |
| Calendered brightness | 73.6 | 71.7 |
| Calendered gloss | 45.7 | 43.0 |
| Printing contrast ratio (opacity) | 95.2 | 94.26 |
| K & N ink abs | 45.0 | 45.8 |

The two points calendered coated brightness improvement in my clay is of immense commercial importance in a light-weight coatings, as is the point improvement in printing contrast ratio, in an 8 pound one-side coat, at an appreciably better gloss. The clay coatings of my invention show a substantial improvement in ink absorbency.

Example II

A coating clay was produced by separating from a natural crude kaolin by centrifuging and sedimentation a clay composition having the following particle size consisting of:

99.5% by wt. less than 5 microns equivalent spherical diameter

89% by wt. less than 1.7 microns equivalent spherical diameter

75% by wt. less than 1 micron equivalent spherical diameter

33% by wt. less than 0.5 micron equivalent spherical diameter

14% by wt. less than 0.3 micron equivalent spherical diameter.

Fourteen (14) ream weight coatings were made with this clay and with a high quality commercial coating clay, employing 14% Superfilm No. 4 starch on clay. Coatings were calendered and tested as follows:

|  | Coat weight | Brightness | Standard opacity | Percent gloss | Wax test | Ink receptivity |
| --- | --- | --- | --- | --- | --- | --- |
| Commercial control | 14.3 | 72.6 | 91.82 | 60.6 | 5 | 46.5 |
| Clay of my invention | 14.6 | 73.9 | 92.30 | 63.0 | 5 | 43.8 |

Brightness determinations were made on the clay alone with the following results.

Clay brightness, percent

Control _____ 86.5
Clay of my invention _____ 86.2

Thus it can be observed that even at 0.4% lower clay brightness, the clay of my invention gave 1.3% better brightness coatings, opacity is improved by 0.48%, a valuable increment; pick test is normal and ink receptivity is better. (The lower value indicates improved ink pickup.)

*Example III*

Since calcium carbonate pigment is widely used in mixtures with coating clays for the purpose of improving brightness and ink receptivity, I admixed the two clays of Example II with 30% of 0.3 micron M grade, Wyandotte calcium carbonate with the following results.

| | Coat weight | Brightness | Standard opacity | Percent gloss | Wax pick | Ink receptivity |
|---|---|---|---|---|---|---|
| Control plus 30% carbonate | 15.9 | 74.5 | 89.93 | 50.4 | 5 | 43.0 |
| Clay of my invention plus 30% carbonate | 14.2 | 75.4 | 92.13 | 53.2 | 5 | 39.8 |

Comparing these data with those for coatings of the two clays without carbonate, it is found that: with the control, brightness gain due to carbonate is 1.9% and opacity loss is 1.89%, whereas with my clay brightness gain due to carbonate is 1.5% and opacity loss is only 0.17%. This gives the clay of my invention with carbonate an advantage over the control with carbonate as follows:

Percent
Brightness _____ 0.9
Opacity _____ 2.2
Gloss _____ 2.8 with equal pick test and better ink receptivity. These are really large improvements. The coating weight on the control being 12% heavier than for the clay of my invention makes these improvements appear even greater.

Further experiments have confirmed these results and show that a kaolin clay having the following size composition will consistently show these improved characteristics of brightness, gloss and opacity over the best grades of commercial coating clay.

99–100% by wt. less than 5 microns equivalent spherical diameter
98–100% by wt. less than 4 microns equivalent spherical diameter
88–100% by wt. less than 1.7 microns equivalent spherical diameter
85–97% by wt. less than 1.5 microns equivalent spherical diameter
70–84% by wt. less than 1.0 micron equivalent spherical diameter
25–37% by wt. less than 0.5 micron equivalent spherical diameter
10–15% by wt. less than 0.3 micron equivalent spherical diameter.

My researches have shown that the equivalent spherical diameter of 1.7 microns is for some reason the upper limit of the optimum size and the greater the percentage under this particular size the better the product so long as the ranges beneath this particular size remain within the limits set out herein. Variations outside of these limits cause marked degradation of the product in one or more of the qualities of coating brightness, coating gloss, opacity or ink absorption.

While I have set out certain preferred embodiments and practices of my invention it will be understood that my invention may be otherwise embodied within the scope of the following claims.

I claim:

1. A coating clay of improved coated brightness, gloss and opacity consisting essentially of clay particles within the size ranges about 88% to 100% by weight of particles less than 1.7 microns in average spherical diameter, about 85% to 90% by weight of particles less than 1.5 microns in average spherical diameter, about 70% to 84% of particles less than 1 micron in average spherical diameter about 25% to 37% of particles below 0.5 micron in average spherical diameter and about 10% to 15% of particles below 0.3 micron in average spherical diameter and wherein the portion present above 1.7 microns comprises about 99% to 100% by weight below 5 microns equivalent spherical diameter and 98 to 100% by weight less than 4 microns equivalent spherical diameter.

2. A coating clay of improved coated brightness, gloss and opacity consisting essentially of clay particles within the size ranges about 88% to 100% by weight of particles less than 1.7 microns in average spherical diameter, about 85% to 90% by weight of particles less than 1.5 microns in average spherical diameter, about 70% to 84% of particles less than 1 micron in average spherical diameter about 25% to 37% of particles below 0.5 micron in average spherical diameter and about 10% to 15% of particles below 0.3 micron in average spherical diameter and wherein the portion present above 1.7 microns comprises about 99% to 100% by weight below 5 microns equivalent spherical diameter and 98 to 100% by weight less than 4 microns equivalent spherical diameter, said particles all having been subjected to a hydrosulfite bleach.

3. A coating clay of improved coated brightness, gloss and opacity consisting essentially of clay particles within the size ranges about 98% by weight less than 5 microns average spherical diameter, about 89% by weight less than 1.7 microns average spherical diameter, about 75% by weight less than 1 micron average spherical diameter, about 32% by weight less than 0.5 micron average spherical diameter and about 11% by weight less than 0.3 micron average spherical diameter.

4. A coating clay of improved coated brightness, gloss and opacity consisting essentially of clay particles within the size ranges about 98% by weight less than 5 microns average spherical diameter, about 89% by weight less than 1.7 microns average spherical diameter, about 75% by weight less than 1 micron average spherical diameter, about 32% by weight less than 0.5 micron average spherical diameter and about 11% by weight less than 0.3 micron average spherical diameter, all of said particles having been subjected to a hydrosulfite bleach.

5. The method of forming a coating clay of high coated brightness, gloss and opacity comprising the steps of successively removing large and small particles from a natural kaolin until not more than 2% by weight of the remaining clay product consists of particles in excess of 5 microns average spherical diameter and not more than 12% by weight exceeds 1.7 microns average spherical diameter and not less than 88% by weight of the product is below 1.7 microns in average spherical diameter, not less than 85% by weight is below 1.5 microns average spherical diameter, not less than 70% by weight is less than 1 micron average spherical diameter, not less than 25% is below 0.5 micron average spherical diameter and not less than 1% or more than 15% is below 0.3 micron.

References Cited in the file of this patent

UNITED STATES PATENTS 2,158,987     Maloney _____ May 16, 1939

OTHER REFERENCES

Huber Corp., "Kaolin Clays and Their Industrial Uses" (1949), pages 109 and 111.

Woodward et al. Tappi, vol. 34, No. 10, October 1951, pages 438–442.